US010324500B2

(12) United States Patent
Schafer et al.

(10) Patent No.: US 10,324,500 B2
(45) Date of Patent: Jun. 18, 2019

(54) HIGH STRENGTH HINGE MECHANISM

(71) Applicant: Microsoft Technology Licensing, LLC, Redmond, WA (US)

(72) Inventors: Christopher Alan Schafer, Redmond, WA (US); Prasad Raghavendra, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/400,850

(22) Filed: Jan. 6, 2017

(65) Prior Publication Data

US 2018/0196478 A1 Jul. 12, 2018

(51) Int. Cl.
| | |
|---|---|
| *G06F 1/16* | (2006.01) |
| *E05D 3/02* | (2006.01) |
| *E05D 11/08* | (2006.01) |
| *E05D 11/06* | (2006.01) |
| *H04M 1/02* | (2006.01) |

(52) U.S. Cl.
CPC ............. *G06F 1/1681* (2013.01); *E05D 3/02* (2013.01); *E05D 11/06* (2013.01); *E05D 11/082* (2013.01); *G06F 1/1616* (2013.01); *H04M 1/0216* (2013.01); *E05Y 2900/606* (2013.01)

(58) Field of Classification Search
CPC .... G06F 1/1652; G06F 1/1616; G06F 1/1681; G06F 1/1618; G06F 1/162; E05D 3/06; E05D 3/10; E05D 11/082; E05D 3/02; E05D 11/06; E05D 3/122; E05D 3/12; H04M 1/022; H04M 1/0216; A47K 13/12

USPC ............... 361/679.04–679.17, 679.21–697.3, 361/679.55–679.57; 16/337, 340, 342, 16/354, 356, 366, 368, 369, 370; 455/575.1–575.3
See application file for complete search history.

(56) References Cited

U.S. PATENT DOCUMENTS

| | | | |
|---|---|---|---|
| 5,043,846 | A | 8/1991 | Kinoshita |
| 5,402,150 | A | 3/1995 | Stiles |
| 5,491,874 | A | 2/1996 | Lowry et al. |
| 5,724,859 | A | 3/1998 | Yamada |

(Continued)

OTHER PUBLICATIONS

Chiu, et al., "The Assessment of Stress Analysis for a Notebook's Hinge Stopper Using the FEM Method", In Journal of Advanced Materials Research, vol. 740, Aug. 2013, pp. 350-358.

(Continued)

*Primary Examiner* — Steven T Sawyer
*Assistant Examiner* — Sagar Shrestha
(74) *Attorney, Agent, or Firm* — Rainier Patents, P.S.

(57) ABSTRACT

A high strength hinge mechanism is described herein. In one or more implementations, a computing device includes a display portion which includes a display device, and a base portion which includes a keyboard. A hinge mechanism is attached to the display portion and the base portion to enable rotation of the display portion relative to the base portion. The hinge mechanism includes a friction element and a cylindrical shaft secured to the friction element and to a chassis of the display portion. The friction element is configured to apply friction to the shaft in a radial direction as the shaft is rotated. The rotation of the shaft enables the display portion to be rotated from a closed position to a fully-open position. The hinge mechanism also includes a frame structure to support the friction element and the shaft.

20 Claims, 6 Drawing Sheets

(56) References Cited

U.S. PATENT DOCUMENTS

| | | | |
|---|---|---|---|
| 5,752,292 A | 5/1998 | Rachel | |
| 5,952,716 A * | 9/1999 | Dibble | H01L 23/49811 257/697 |
| 6,408,485 B1 | 6/2002 | Wu | |
| 6,666,422 B1 | 12/2003 | Lu et al. | |
| 6,868,582 B2 | 3/2005 | Lu et al. | |
| 7,724,511 B2 | 5/2010 | Jacobs | |
| 8,359,710 B2 | 1/2013 | Degner et al. | |
| 8,479,359 B2 | 7/2013 | Yabe et al. | |
| 8,991,011 B2 * | 3/2015 | Liu | G06F 1/1613 16/303 |
| 2002/0133907 A1 * | 9/2002 | Oshima | F16C 11/10 16/321 |
| 2003/0126719 A1 | 7/2003 | Chen | |
| 2004/0049885 A1 * | 3/2004 | Lu | G06F 1/1616 16/342 |
| 2005/0204509 A1 * | 9/2005 | Lin | E05D 11/087 16/342 |
| 2007/0000088 A1 | 1/2007 | Mao et al. | |
| 2007/0084014 A1 | 4/2007 | Tseng | |
| 2008/0184530 A1 * | 8/2008 | Chao | E05D 7/1061 16/342 |
| 2009/0011840 A1 | 1/2009 | Lu | |
| 2009/0151116 A1 | 6/2009 | Lin | |
| 2010/0064475 A1 * | 3/2010 | Wang | G06F 1/1616 16/232 |
| 2010/0071156 A1 * | 3/2010 | Wang | E05D 11/087 16/297 |
| 2010/0088853 A1 * | 4/2010 | Degner | G06F 1/1616 16/342 |
| 2010/0139042 A1 * | 6/2010 | Chang | G06F 1/1616 16/297 |
| 2010/0281653 A1 * | 11/2010 | Lin | G06F 1/1616 16/285 |
| 2011/0146028 A1 | 6/2011 | Lee | |
| 2013/0010424 A1 * | 1/2013 | Degner | G06F 1/1681 361/679.55 |
| 2013/0342974 A1 * | 12/2013 | Hung | G06F 1/1681 361/679.01 |
| 2014/0026366 A1 * | 1/2014 | Hsu | G06F 1/1681 16/337 |
| 2014/0331452 A1 * | 11/2014 | Zhang | G06F 1/1681 16/337 |
| 2016/0109909 A1 * | 4/2016 | Kim | G06F 1/1681 361/679.55 |

OTHER PUBLICATIONS

"International Search Report and Written Opinion Issued in PCT Application No. PCT/US2017/068845", dated Feb. 28, 2018, 18 Pages.

* cited by examiner

HIGH STRENGTH HINGE MECHANISM

BACKGROUND

Computing devices are becoming increasingly thinner which limits the volume and diameter available for the hinge to occupy. Computing devices are subjected to large loads during daily use, as well as abuse from accidental drops, display overload use scenarios, and so forth. Some existing device hinges are not well equipped to handle these use and abuse scenarios which often lead to stress and damage to the hinge.

SUMMARY

A high strength hinge mechanism is described herein. In one or more implementations, a computing device includes a display portion which includes a display device, and a base portion which includes a keyboard. A hinge mechanism is attached to the display portion and the base portion to enable rotation of the display portion relative to the base portion. The hinge mechanism includes a friction element and a cylindrical shaft secured to the friction element and to a chassis of the display portion. The friction element is configured to apply friction to the shaft in a radial direction as the shaft is rotated. The rotation of the shaft enables the display portion to be rotated from a closed position to a fully-open position.

The hinge mechanism also includes a frame structure to support the friction element and the shaft. The frame structure includes a closed loop configured to receive the shaft. The closed loop of the frame structure is positioned between the friction element and the chassis of the display portion and constrains the position of the shaft such that the shaft is subjected to reduced movement or stress. The frame structure is further configured to constrain a rotational stopping position of the shaft thereby preventing the display portion from being rotated past the fully-open position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
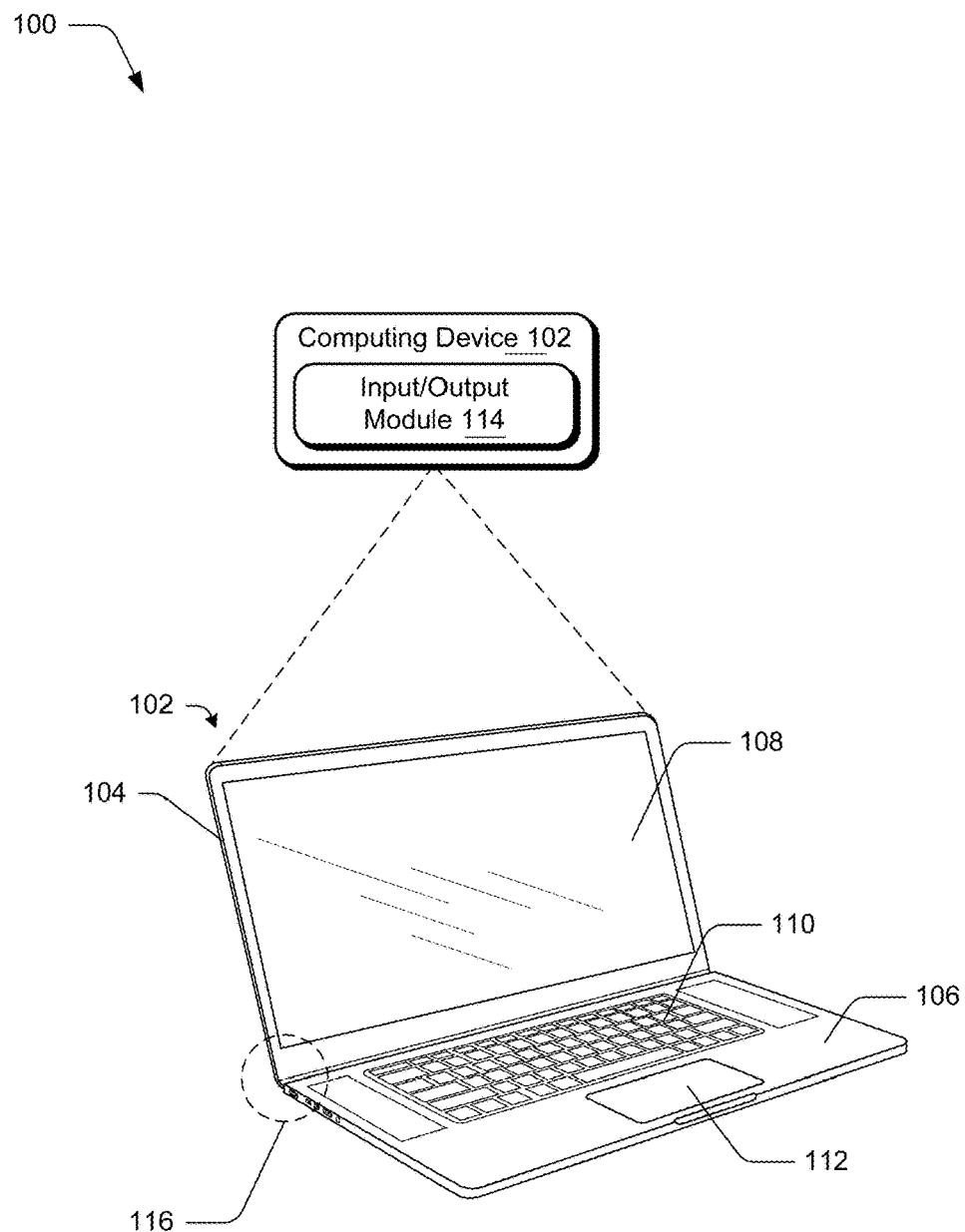
FIG. 1 is an illustration of an environment in an example implementation that is operable to employ the high strength hinge mechanism described herein.

A high strength hinge mechanism is described herein. In one or more implementations, a computing device includes a display portion, which includes a display device, and a base portion which includes a keyboard. A hinge mechanism is attached to the display portion and the base portion to enable rotation of the display portion relative to the base portion. The hinge mechanism provides friction as the display portion is rotated to various positions. The friction applied by the hinge mechanism also holds the display portion in place during use.

The hinge mechanism includes a friction element and a cylindrical shaft secured to the friction element and to a chassis of the display portion. The friction element is configured to apply friction to the shaft in a radial direction as the shaft is rotated. The rotation of the shaft enables the display portion to be rotated from a closed position to a fully-open position. In some cases, the friction element may be implemented as a sheet metal friction element which includes two partially-closed loops of opposite direction which apply friction to the shaft as the display portion is rotated relative to the base portion.

In other hinge designs, the friction element is also relied on as a "stop gate" mechanism to prevent the display portion from being rotated past the fully-open position. However, as the friction element is an open sheet metal loop, the friction element of other hinge designs would be subjected to stress and damage during use, especially in instances where a user attempts to violently push the display portion past the fully-open position.

Unlike other hinge designs, the high strength hinge mechanism described herein further includes a frame structure to support the friction element and the shaft. The frame structure is formed from a strong material such as steel, and provides reduced stress and yielding on the friction element and shaft during use and abuse as compared to other hinge designs. The frame structure includes a closed loop configured to receive the shaft. The closed loop of the frame structure is positioned between the friction element and the chassis of the display portion and constrains the position of the shaft such that the shaft is subjected to reduced movement or stress. In other hinge designs, this portion of the shaft was left unsupported, which subjected the shaft to stress and damage in the event that the computing device was dropped.

Additionally, instead of using the friction element as a stop gate mechanism, the frame structure is configured to constrain a rotational stopping position of the shaft thereby preventing the display portion from being rotated past the fully-open position. The incorporation of the frame structure in to the hinge mechanism allows additional material to be added to high stress areas, and thus is much better equipped to withstand the force applied from the user attempting to push the display portion past the fully-open position.

The high strength hinge mechanism described herein has increased stiffness during display touch and a decreased risk of damage during use and abuse scenarios, such as overloading the display by pushing the display past the fully-open position or when the user accidentally drops the computing device. During testing, the shaft of the hinge mechanism experienced reduced stress and reduced incidence of failure during drop testing due to the improved support that the frame structure provides. Also, these improvements occur without a large increase in the size of the hinge mechanism as compared to other designs. As such, the hinge mechanism described herein enables the hinge mechanism to be used in thin laptop designs while also providing the aforementioned benefits.

FIG. 1 is an illustration of an environment 100 in an example implementation that is operable to employ the high strength hinge mechanism described herein. Environment 100 includes an example of a computing device 102, which includes a display portion 104 and a base portion 106. In various implementations, computing device 102 is a laptop computer, personal computer, gaming device, smart phone, and other similar devices. Computing device 102 may also be referred to as laptop 102. In this example, the display portion 104 includes a display device 108 and the base portion 106 includes a keyboard 110 and a trackpad 112. In this example, keyboard 110 has a QWERTY arrangement of keys although other arrangements of keys are also contemplated, such AZERTY, QWERTZ, or Dvorak. Alternative examples can also include fewer or more keys than the keyboard 110 shown in FIG. 1. For example, an alternative keyboard may include a numerical keypad on the right hand side. Furthermore, in some cases, base portion 106 can be implemented without a trackpad 112. Thus, the keyboard 110 may assume a variety of different configurations to support a variety of different functionality.

Laptop 102 is illustrated as including an input/output module 114. The input/output module 114 is representative of functionality relating to processing of inputs and rendering outputs of the laptop 102. A variety of different inputs may be processed by the input/output module 114, such as inputs relating to functions that correspond to keys of the keyboard 110, input to trackpad 112, input to a peripheral input device coupled to the laptop 102 (e.g., a wired or wireless mouse device), touch input to display device 108 in cases where display device 108 is configured with touchscreen functionality, and so forth. Thus, the input/output module 114 may support a variety of different input techniques by recognizing and leveraging a division between types of inputs including keypresses, gestures, and so on.

Laptop 102 further includes a hinge mechanism 116 which enables rotation of the display portion 104 from a closed position to a fully-open position. The angle between the display portion 104 and the base portion 106 in the fully-open position may range from 90 degrees to 180 degrees. In some implementations, the angle between the display portion 104 and the base portion 106 in the fully-open position is approximately 135 degrees. The hinge mechanism 116 also enables the display portion to be held in place in various positions between the closed position and the fully-open position. In FIG. 1, for example, the laptop 102 is in an open position with an angle of approximately 90 degrees between the display portion 104 and the base portion 106. The hinge mechanism 116 may be configured in a variety of ways, further discussion of which may be found in relation to FIGS. 2-5.

Figure 2:
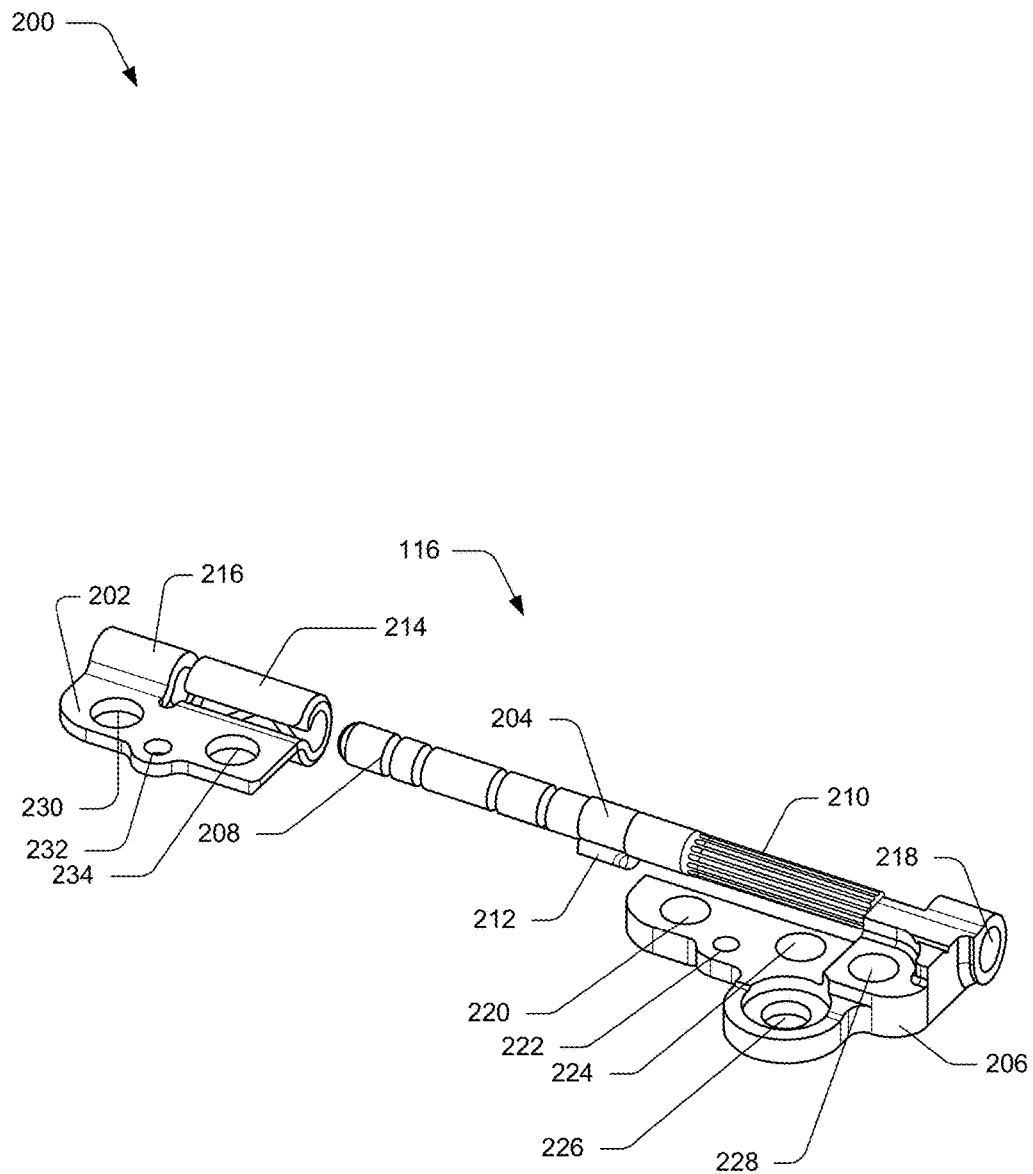
FIG. 2 illustrates an example of the components of a hinge mechanism in an unassembled state

FIG. 2 illustrates an example 200 of the components of hinge mechanism 116 in an unassembled state. In this example, hinge mechanism 116 includes a friction element 202 and a cylindrical shaft 204 which, when assembled, is secured to the friction element 202. The friction element 202 and the shaft 204 are supported by a frame structure 206.

The shaft 204 enables the rotation of the display portion 104 relative to the base portion 106, such that the display portion 104 can be rotated from a closed position to the fully-open position. When assembled and attached to laptop 102, a first end 208 of shaft 204 extends through the friction element 202, while a second end 210 of shaft 204 extends through frame 206 and into a chassis of the display portion 104 (not pictured), where it is secured. Shaft 204 also includes a stop tab 212, which, as discussed in more detail below, prevents the display portion 104 from being rotated past the "fully-open" position. A diameter of the shaft 204 is relatively fixed, and is driven by the allowable outer diameter area of the friction element 202.

The friction element 202 provides friction to the shaft 204 in a radial direction as the shaft 204 is rotated. The friction generated by friction element 202 enables the display portion 104 to be rotated to various positions (e.g., from the closed position to the fully-open position), while also holding the display portion 104 in position during use. In this example, friction element 202 is implemented as a sheet metal friction element, and includes two "partially-closed loops" of opposite direction. A first partially-closed loop 214 is wrapped around the shaft 204 in a first direction, while a second partially-closed loop 216 is wrapped around the shaft 204 in a second direction that is opposite the first direction. The first partially-closed loop 214 applies more friction per unit length to the shaft 204 as the base portion 106 is rotated towards the fully-closed position, while the second partially-closed loop 216 applies more friction per unit length to the shaft 204 as display portion 104 is rotated towards the open position.

Notably, wrapping the friction element 202 around the shaft 204 in opposite directions allows the designer to optimize the opening and closing torque of the hinge mechanism 116. The friction applied by the friction element 202 also enables the display portion 104 to be held in place during use.

Frame structure 206 provides strength and extra support for friction element 202 and shaft 204. The frame structure 206 is formed from a strong material such as steel, and provides reduced stress and yielding on the friction element 202 and shaft 204 during use and abuse as compared to other hinges.

Frame structure 206 constrains the position of shaft 204 such that the shaft 204 is subjected to reduced movement or stress. To do so, frame structure 206 includes a closed loop 218 through which the shaft 204 extends. When coupled to laptop 102, the closed loop 218 of frame structure 206 is positioned between the friction element 202 and a chassis of the display portion 104. In other hinge designs, this portion of the shaft 204 was left unsupported, which subjected the shaft 204 to stress and damage in the event that the laptop 102 was dropped.

In addition, the frame structure 206 constrains a rotational stopping position of the shaft 204 thereby preventing the display portion from being rotated past the fully-open position. To do so, the frame structure 206 is configured so that the stop tab 212 makes contact with the frame structure 206, and not the friction element 202, when the display portion 104 is rotated to the fully-open position. The contact of the stop tab 212 with the frame structure 206 prevents the rotation of the display portion 104 past the fully-open position. The frame structure 206 is much better equipped than the friction element 202 to handle this force because it is not constrained to a single relatively low thickness by its manufacturing process like the friction element 202.

The friction element 202 and frame structure 206 can be manufactured as separate components, which provides a variety of benefits. For one, the friction element 202 is often manufactured from sheet metal, while the frame structure 206 can be manufactured by a process such as molding, computer numerical control (CNC) machining, and so forth, which allows additional material to be added in high stress areas. The material of friction element 202 enables the manufacturing of friction element 202 to be simple and low-cost.

In this example, frame structure 206 includes five holes, labeled as 220, 222, 224, 226, and 228, and friction element 202 includes three holes, labeled as 230, 232, and 234. These holes enable the frame structure 206 to be combined with the friction element 202 when the hinge mechanism 116 is installed in laptop 102.

Figure 3:
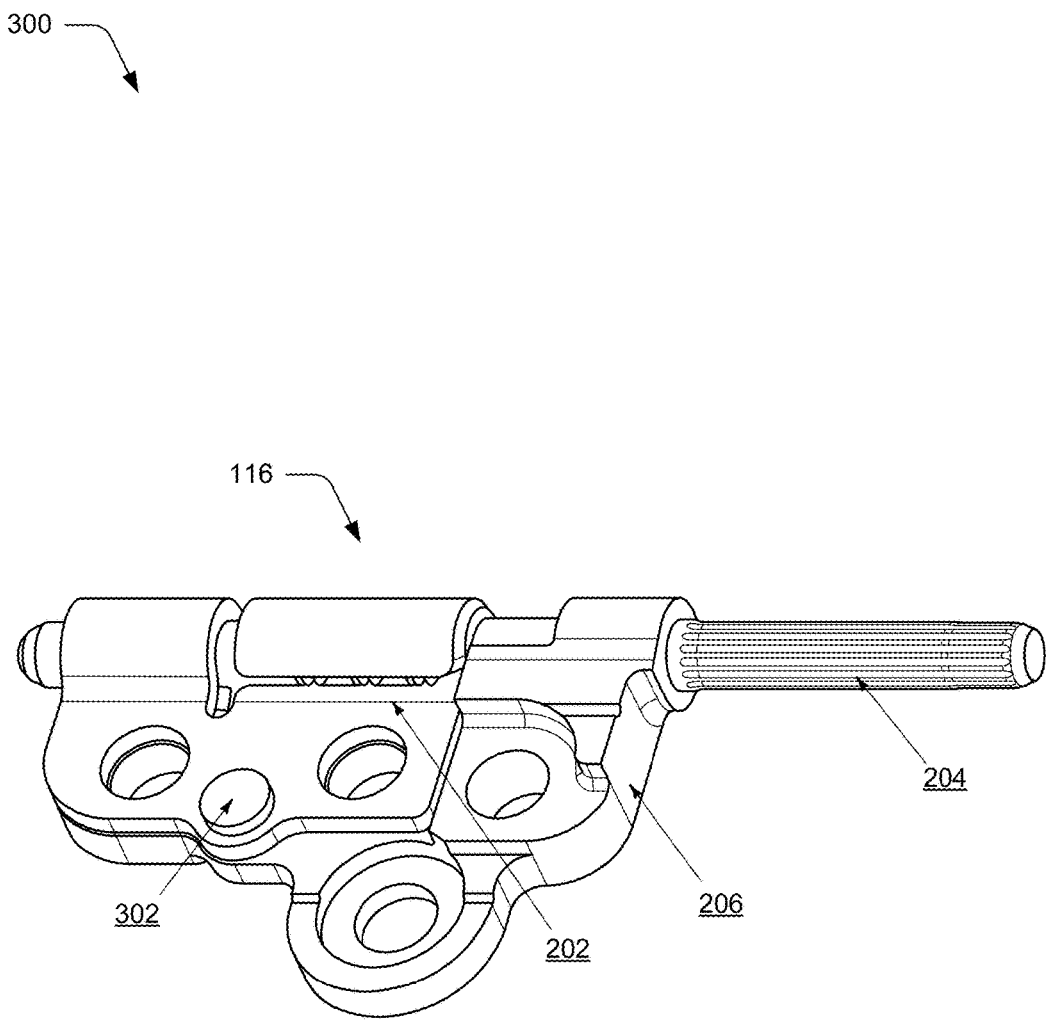
FIG. 3 illustrates an example of the hinge mechanism in an assembled state.

FIG. 3 illustrates an example 300 of the hinge mechanism 116 in an assembled state. As shown in FIG. 3, the first end 208 of shaft 204 extends through the partially-closed loops 214 and 216 of friction element 202, and the second end 210 of shaft 204 extends through the closed loop 218 of frame structure 206. In this example, a rivet 302 is placed through hole 222 of frame structure 206 and hole 232 of friction element 202 in order to secure the friction element 202 to the frame structure 206. The rivet 302 is primarily used during the assembly process to secure the hinge mechanism 116 at the component level.

Figure 4:
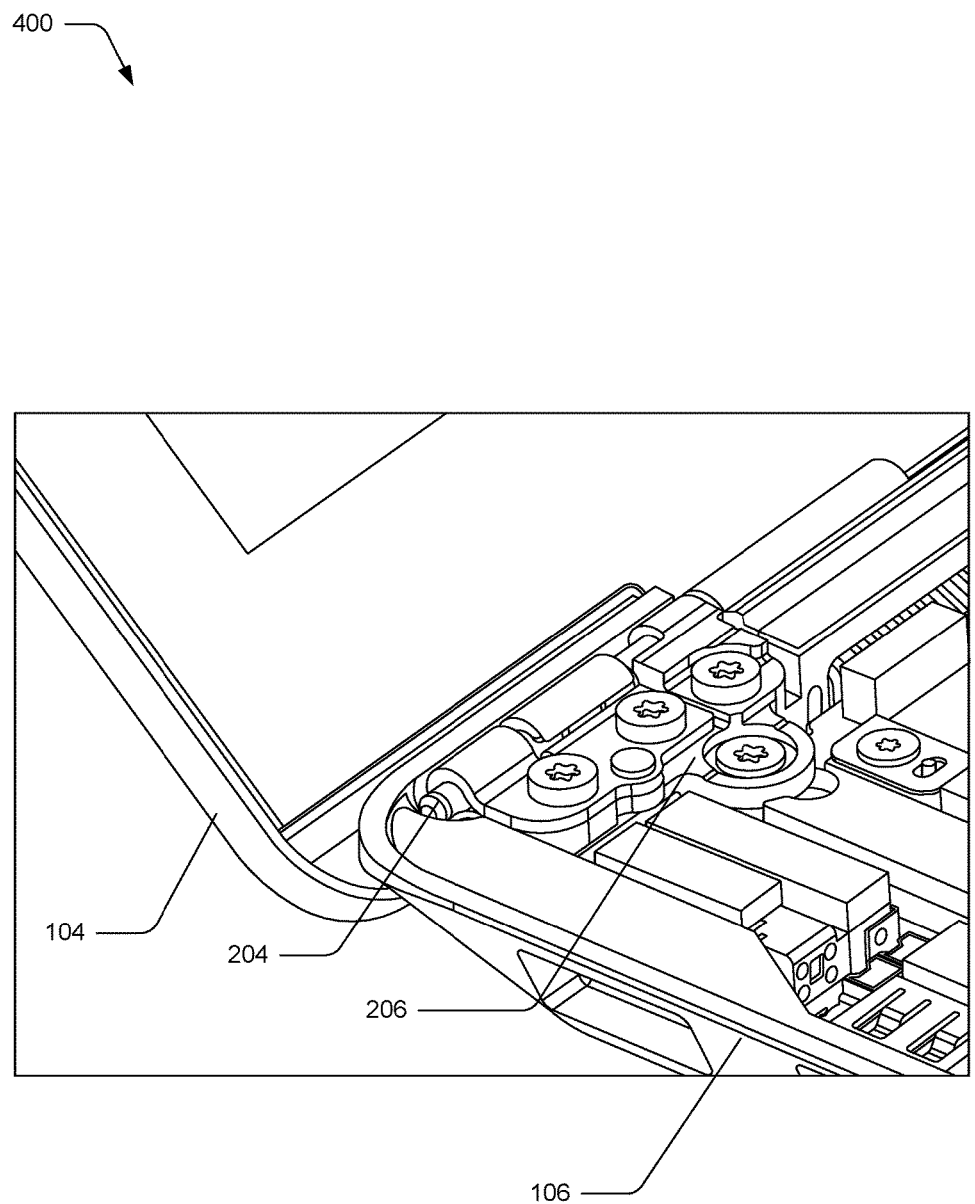
FIG. 4 illustrates an example of the hinge mechanism when installed in a laptop.

FIG. 4 illustrates an example 200 of the hinge mechanism 116 when installed in the laptop 102.

In this example, hinge mechanism 116 is coupled to the base portion 106 of laptop 102 at an upper left corner of the base portion 106. An additional hinge mechanism 116 (not pictured) may be similarly implemented at an upper right corner of the base portion 106.

Hinge mechanism 116 is secured to the base portion 106 via one or more screws 402. In this example, four screws are utilized to secure the hinge mechanism 116 to the base portion 106. Notably, two of the screws extend through holes in both the friction element 202 and the frame structure 206 into the base portion 106, and two other screws extend through just the frame structure 206 into the base portion 106. Of course, other implementations are also contemplated. Generally, the friction element 202 and the frame structure 206 each include at least one hole through which at least one screw extends in order to constrain the friction element 202 to the frame structure 206 when the hinge mechanism 116 is in the assembled state and installed in the laptop 102.

Hinge mechanism 116 is also attached to the display portion 104 of laptop 102. To do so, the first end 208 of shaft 204 is press fit into a chassis 404 of display portion 104. The closed loop 218 of frame structure 206 is positioned proximate the chassis 404 of display portion 104, and between the chassis 404 and the friction element 202. In other hinge designs, this portion of shaft 204 was left unsupported, which caused a great amount of stress on shaft 204 in the event that the laptop 102 was dropped. Now, frame structure 206 protects the shaft 204 by constraining the movement and position of the shaft 204 such that only a very small portion of the shaft 204 is left exposed, which greatly reduces stress on the shaft 204. Constraining the shaft 204 as close as possible to the chassis 404 of display portion 104 prevents bending of the shaft 204 or high stress levels in the event that laptop 102 is dropped.

In this example, the first partially-closed loop 214 of friction element 202 applies more friction per unit length to shaft 204 as shaft 204 is rotated in a first direction, such as when display portion 104 of the laptop 102 is rotated towards the closed position. The second partially-closed loop 216 applies friction to shaft 204 when the shaft 204 is rotated in a second direction that is opposite the first direction, such as when the display portion 104 of laptop 102 is rotated towards the fully-open position. The friction applied by friction element 202 to shaft 204 also enables the display portion 104 to be held in place during use.

As the shaft 204 is rotated towards the open position, the first partially-closed loop 214 opens from the tension applied by the display portion 104 being opened. In the past, the first partially-closed loop 214 was relied on to prevent the display portion 104 from being opened past the fully-open position. However, as the friction element 202 is simply an open sheet metal loop, it is not designed to withstand the stress that would occur if the user attempted to violently push the display portion 104 past the fully-open position. As such, the friction element 202 of other hinge designs would often become damaged during use.

Frame structure 206 constrains the rotational stopping position of shaft 204 instead of friction element 202. To do so, stop tab 212 of shaft 204 is positioned such that it makes contact with frame structure 206, instead of friction element 202, when the display portion 104 is rotated to the fully-open position. Thus, if the user attempts to push display portion 104 past the fully-open position, the frame structure 206 absorbs this force.

Figure 5:
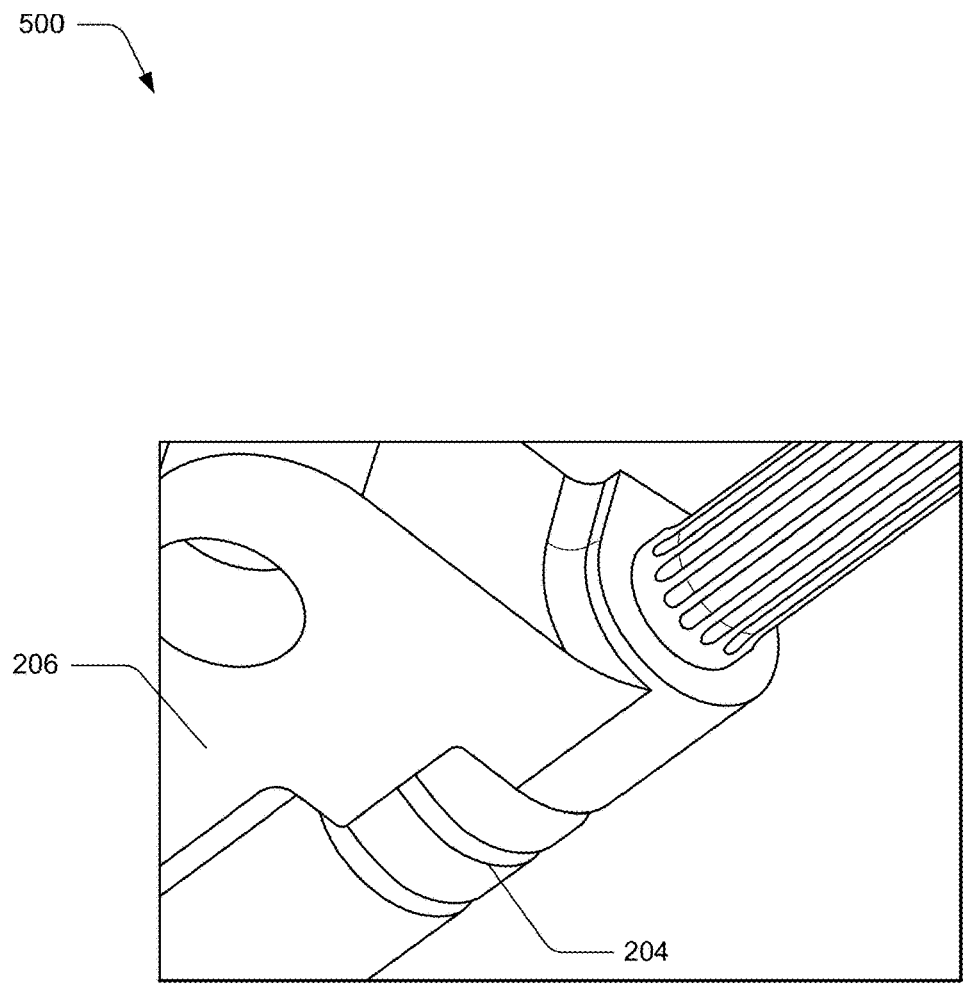
FIG. 5 illustrates an example of the stop tab of a shaft of the hinge mechanism making contact with the frame structure.

Consider, for example, FIG. 5 which illustrates an example 500 of the stop tab 212 of shaft 204 of the hinge mechanism 116 making contact with the frame structure 206. As can be seen in FIG. 5, the stop tab 212 makes contact with the frame structure 206, and not the friction element 202, when the display portion 104 is rotated to the fully-open position. The frame structure 206 is made of a stronger geometry than the friction element 202 which is often made of sheet metal. As such, the frame structure is better able to withstand the force applied by the stop tab 212. Furthermore, the hinge mechanism 116 is designed such that the frame structure 206 is thick in the area at which the stop tab 212 makes contact with the frame structure 206. For example, while the friction element 202 may have a thickness of just 0.8 millimeters, the frame structure 206 at the position of contact, may be approximately 2.0 millimeters.

Figure 6:
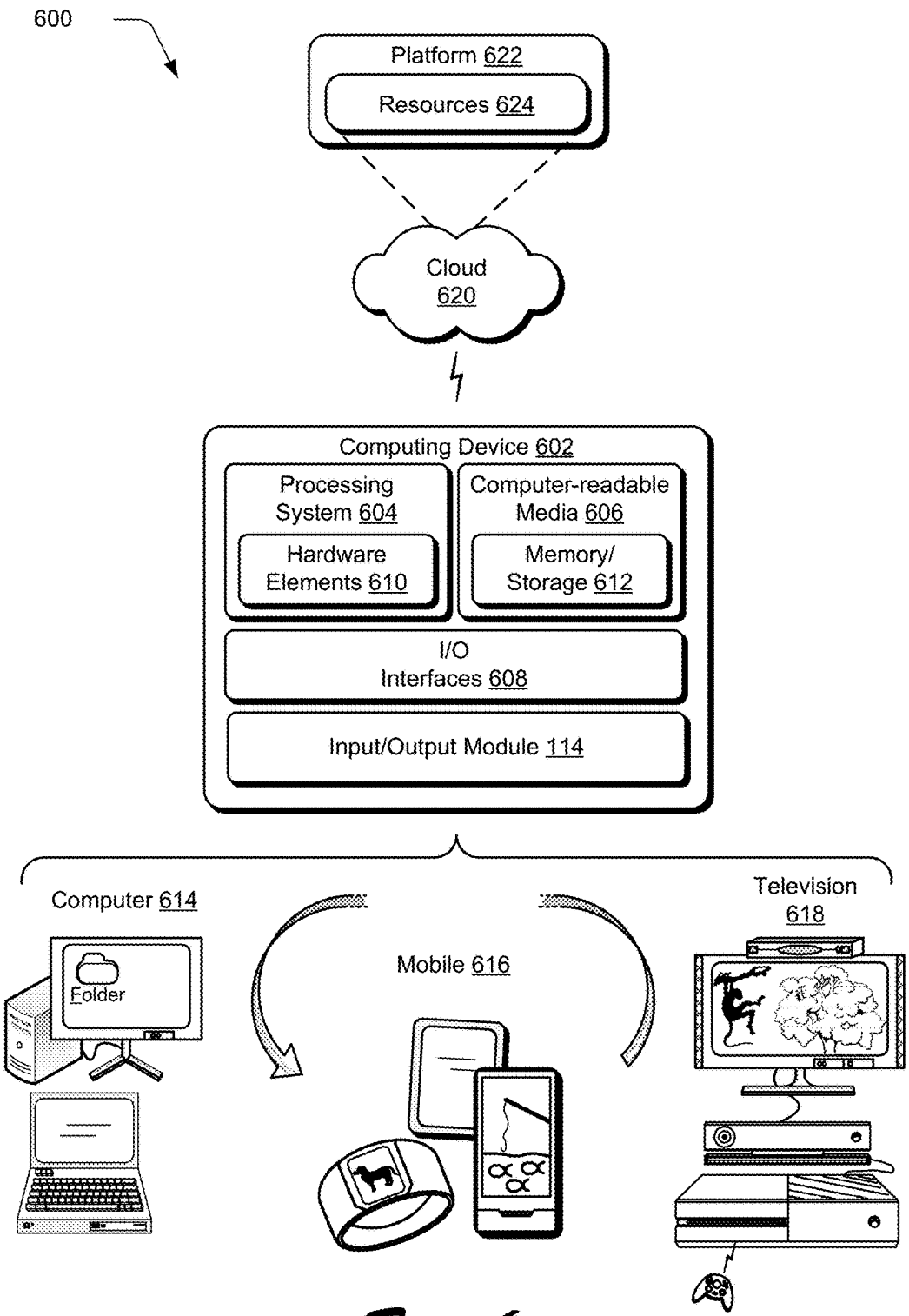
FIG. 6 illustrates an example system that includes an example computing device that is representative of one or more computing systems and/or devices that may implement the various techniques described herein.

FIG. 6 illustrates an example system generally at 600 that includes an example computing device 602 that is representative of one or more computing systems and/or devices that may implement the various techniques described herein. This is illustrated through inclusion of the input/output module 114. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware.

Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In an implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In another implementation, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, wearables (e.g., wrist bands, pendants, rings, etc.) portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on. Other devices are also contemplated, such as appliances, thermostats and so on as part of the "Internet of Things."

The techniques described herein may be supported by these various configurations of the computing device 602 and are not limited to the specific examples of the techniques described herein. This functionality may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device, implementation of functionality described herein may be distributed throughout the system 600. For example, the functionality may be implemented in part on the computing device 602 as well as via the platform 622 that abstracts the functionality of the cloud 620.

Example implementations described herein include, but are not limited to, one or any combinations of one or more of the following examples:

In one or more examples, a computing device comprises: a display portion comprising a display device; a base portion comprising a keyboard; and a hinge mechanism attached to the display portion and the base portion, the hinge mechanism comprising: a friction element; a cylindrical shaft secured to the friction element and to a chassis of the display portion, the friction element configured to apply friction to the shaft in a radial direction as the shaft is rotated, the rotation of the shaft enabling the display portion to be rotated from a closed position to a fully-open position; and a frame structure to support the friction element and the shaft, the frame structure comprising a closed loop configured to receive the shaft, the closed loop of the frame structure positioned between the friction element and the chassis of the display portion.

An example as described alone or in combination with any of the other examples described above or below, wherein the frame structure is configured to constrain a rotational stopping position of the shaft thereby preventing the display portion from being rotated past the fully-open position.

An example as described alone or in combination with any of the other examples described above or below, wherein the shaft includes a stop tab that is configured to make contact with the frame structure when the display portion is rotated to the fully-open position, the contact of the stop tab with the frame structure preventing rotation of the display portion past the fully-open position.

An example as described alone or in combination with any of the other examples described above or below, wherein the closed loop of the frame structure constrains a position of the shaft such that the shaft is subjected to reduced movement or stress.

An example as described alone or in combination with any of the other examples described above or below, wherein the friction element includes a first partially-closed loop that is wrapped around the shaft in a first direction and a second partially-closed loop that is wrapped around the shaft in a second direction, wherein the first partially-closed loop applies more friction per unit length to the shaft as the display portion is rotated towards the closed, and wherein the second partially-closed loop applies more friction per unit length to the shaft as the display portion is rotated towards the fully-open position.

An example as described alone or in combination with any of the other examples described above or below, wherein the hinge mechanism is secured to the base portion via one or more screws that extend through at least one hole in the friction element and at least one corresponding hole in the frame structure.

An example as described alone or in combination with any of the other examples described above or below, wherein the friction element and the frame structure are separate components.

An example as described alone or in combination with any of the other examples described above or below, wherein the frame structure is manufactured using a process which allows additional material to be added in high stress areas.

An example as described alone or in combination with any of the other examples described above or below, wherein the friction element is configured to hold the display portion in place at various positions between the closed position and the fully-open position.

In one or more examples, a hinge mechanism is configured to enable rotation of a display portion of a computing device relative to a base portion of the computing device, the hinge mechanism comprises: a friction element; a shaft secured to the friction element and to a chassis of the display portion, the friction element configured to apply friction to the shaft in a radial direction as the shaft is rotated, the rotation of the shaft enabling the display portion to be rotated relative to the base portion; and a frame structure to constrain a rotational stopping position of the shaft thereby preventing the display portion from being rotated past a fully-open position.

An example as described alone or in combination with any of the other examples described above or below, wherein the shaft includes a stop tab that is configured to make contact with the frame structure when the display portion is rotated to the fully-open position, the contact of the stop tab with the frame structure preventing rotation of the display portion past the fully-open position.

An example as described alone or in combination with any of the other examples described above or below, wherein the frame structure includes a closed loop configured to receive the shaft, the closed loop of the frame structure positioned between the friction element and the chassis of the display portion.

An example as described alone or in combination with any of the other examples described above or below, wherein the closed loop of the frame structure constrains a position of the shaft such that the shaft is subjected to reduced movement or stress.

An example as described alone or in combination with any of the other examples described above or below, wherein the friction element includes a first partially-closed loop that is wrapped around the shaft in a first direction and a second partially-closed loop that is wrapped around the shaft in a second direction.

An example as described alone or in combination with any of the other examples described above or below, wherein the first partially-closed loop applies more friction per unit length to the shaft as the display portion is rotated towards the closed position, and wherein the second partially-closed loop applies more friction per unit length to the shaft as the display portion is rotated towards the fully open position.

An example as described alone or in combination with any of the other examples described above or below, wherein the hinge mechanism is secured to the base portion of the computing device via one or more screws that extend through at least one hole in the friction element and at least one corresponding hole in the frame structure.

An example as described alone or in combination with any of the other examples described above or below, wherein the friction element and the frame structure are separate components.

An example as described alone or in combination with any of the other examples described above or below, wherein the frame structure is manufactured using a process which allows additional material to be added in high stress areas.

An example as described alone or in combination with any of the other examples described above or below, wherein the friction element is configured to hold the display portion in place at various positions between the closed position and the fully-open position.

An example as described alone or in combination with any of the other examples described above or below, wherein the angle between the display portion and the base portion in the fully-open position comprises an angle between 90 degrees and 180 degrees.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computing device comprising:
    a display portion;
    a base portion; and
    a hinge mechanism attached to the display portion and the base portion, the hinge mechanism comprising:
        a shaft secured to the display portion and the base portion such that the display portion and the base portion rotate via the shaft between a closed position and a fully-open position, the shaft comprising a stop tab;
        a friction element secured to the base portion and comprising a first loop and a second loop, the first loop configured to apply more friction per unit length to the shaft than the second loop when the display portion and base portion are rotated toward the closed position, and the second loop configured to apply more friction per unit length to the shaft than the first loop as the display portion is rotated towards the fully-open position; and
        a frame structure secured to the friction element, to the shaft, and to the base portion, a portion of the frame structure positioned between the friction element and the base portion, the stop tab configured to make contact with the frame structure to prevent rotation of the display portion past the fully-open position.

2. The computing device of claim 1, wherein the first loop is a partially-closed loop.

3. The computing device of claim 2, wherein the second loop is another partially-closed loop and the second loop partially encircles the shaft in an opposite direction from the first loop.

4. The computing device of claim 1, wherein the friction element defines a hole that overlays a corresponding hole defined by the frame structure.

5. The computing device of claim 4, wherein the friction element and the frame structure are secured to the base portion via a rivet that passes through the hole and the corresponding hole and into the base portion.

6. The computing device of claim 5, wherein the hole, the corresponding hole, and the rivet comprise multiple holes, multiple corresponding holes, and multiple rivets, respectively.

7. The computing device of claim 1, wherein the friction element is configured to hold the display portion in place at various positions between the closed position and the fully-open position.

8. A computing device comprising:
    a display portion;
    a base portion; and a hinge mechanism securing the display portion and the base portion and configured to allow rotation of the display portion relative to the base portion, the hinge mechanism comprising:
- a friction element defining a first friction element loop, a second friction element loop, and a hole;
- a frame structure defining a frame structure loop and a corresponding hole, the frame structure positioned against the friction element such that the hole and the corresponding hole are aligned; and
- a shaft secured to the friction element via the first friction element loop and the second friction element loop, and secured to the frame structure via the frame structure loop, the first friction element loop configured to apply a first frictional force to the shaft in an instance where the display portion and the base portion are rotated towards a closed position via the shaft, and the second friction element loop configured to apply a second frictional force to the shaft in another instance where the display portion and the base portion are rotated towards a fully-open position via the shaft, the shaft comprising a stop tab that prevents over-rotation of the display portion past the fully-open position.

9. The computing device of claim 8, wherein the stop tab is configured to make contact with the frame structure when the shaft is rotated relative to the frame structure.

10. The computing device of claim 8, wherein the first friction element loop comprises a first partially-closed loop that is wrapped around the shaft in a first direction and the second friction element loop comprises a second partially-closed loop that is wrapped around the shaft in a second direction.

11. The computing device of claim 10, wherein the first partially-closed loop applies more friction per unit length to the shaft than the second partially-closed loop as the shaft is rotated relative to the friction element in a first rotational direction toward the closed position, and wherein the second partially-closed loop applies more friction per unit length to the shaft than the first partially-closed loop as the shaft is rotated relative to the friction element in a second rotational direction toward the fully-open position.

12. The computing device of claim 8, wherein the frame structure is secured to the friction element via a rivet that extends through the hole in the friction element and the corresponding hole in the frame structure.

13. The computing device of claim 8, wherein the friction element and the frame structure are separate components.

14. A computing device comprising:
- a display portion;
- a base portion; and
- a hinge mechanism securing the display portion and the base portion and configured to allow rotation of the display portion relative to the base portion between a closed position and a fully-open position, the hinge mechanism comprising:
  - a shaft comprising a stop tab that prevents over-rotation of the display portion relative to the base portion,
  - a frame structure secured to the base portion, the frame structure comprising a frame structure loop secured to the shaft, and
  - a friction element secured to the frame structure, the friction element comprising a friction element loop configured to apply a first frictional force to the shaft when the display portion and base portion are rotated toward the closed position and the friction element comprising another friction element loop configured to apply a second frictional force to the shaft when the display portion and base portion are rotated toward the fully-open position.

15. The computing device of claim 14, wherein the frame structure loop is a closed loop that encircles the shaft.

16. The computing device of claim 15, wherein the friction element loop is a partially-closed loop that partially encircles the shaft.

17. The computing device of claim 14, wherein the friction element loop is configured to apply more friction per unit length to the shaft than the another friction element loop when the display portion and the base portion are rotated toward the closed position.

18. The computing device of claim 17, wherein the another friction element loop is configured to apply more friction per unit length to the shaft than the friction element loop when the display portion and the base portion are rotated toward the fully-open position.

19. The computing device of claim 18, wherein the friction element loop and the another friction element loop are partially-closed loops that partially encircle the shaft.

20. The computing device of claim 19, wherein the friction element loop and the another friction element loop partially encircle the shaft in different directions.

* * * * *